United States Patent [19]
Hamon

[11] 3,760,208
[45] Sept. 18, 1973

[54] ELECTROMAGNETIC STEPPING MOTOR

[75] Inventor: Emile Francois Joseph Hamon, La Seyne Sur Mer, France

[73] Assignee: Etat Francais represente par Le Ministre d'Etat charge de La Defense Nationale-Delegation Ministerielle pour L'Armement, Paris, France

[22] Filed: July 31, 1972

[21] Appl. No.: 276,723

[52] U.S. Cl. .................... 310/49, 335/254, 340/378
[51] Int. Cl. ........................................... H02k 37/00
[58] Field of Search .................. 310/49, 37, 21, 23, 310/36, 38, 49 H, 156, 91; 335/253, 254; 340/378, 378 MW, 373, 376

[56] References Cited
UNITED STATES PATENTS

| | | | |
|---|---|---|---|
| 2,866,109 | 12/1958 | Watson | 310/37 |
| 3,121,812 | 2/1964 | MacArthur | 310/49 |
| 3,158,796 | 11/1964 | Musgrave | 335/253 X |
| 3,217,192 | 11/1965 | Feightner | 310/49 |
| 3,391,289 | 7/1968 | Danilewicz et al. | 310/49 X |
| 3,502,914 | 3/1970 | Cox | 310/49 |
| 3,671,899 | 6/1972 | Clift | 340/378 MW |
| 3,680,083 | 7/1972 | Pihl | 340/378 |

Primary Examiner—D. F. Duggan
Attorney—Eric H. Waters et al.

[57] ABSTRACT

An electromagnetic stepping motor with interdependent controls, especially suitable for the internal controls of missiles, torpedoes and magnetic mines. A mobile slide is provided in a molded structure carrying firstly two permanent magnets enabling motor action on excitation of magnetic frames by control windings, and secondly two permanent magnets securing mechanical locking in each position. This device can be used in programming systems, arming jacks for propellants or military charges, valves or gate controls.

17 Claims, 24 Drawing Figures

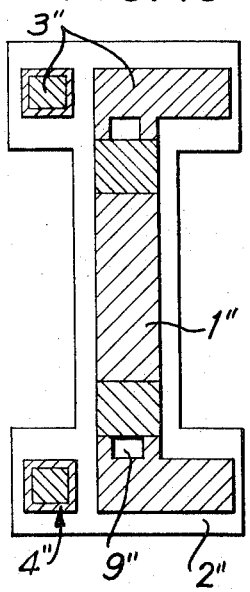
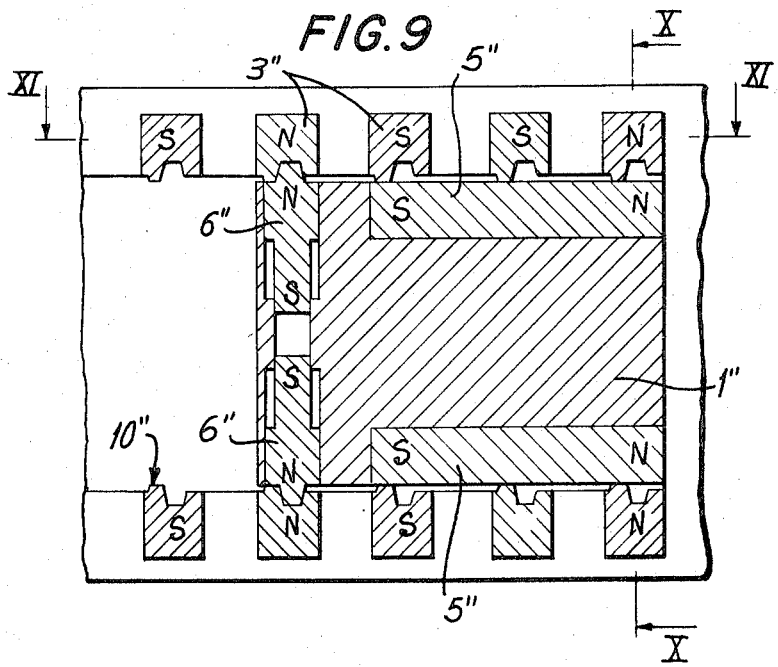
FIG. 10  FIG. 9
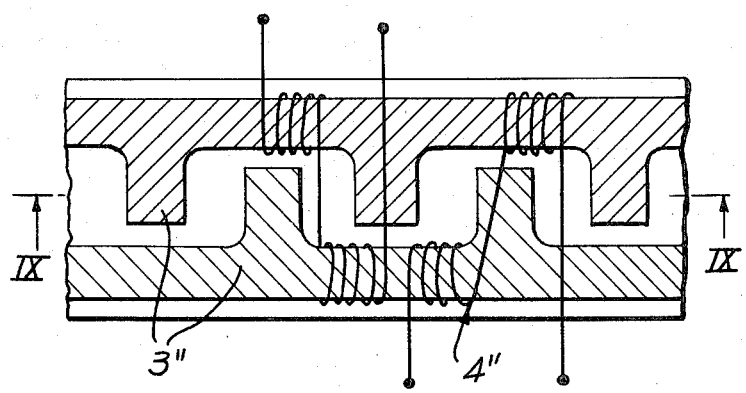
FIG. 11

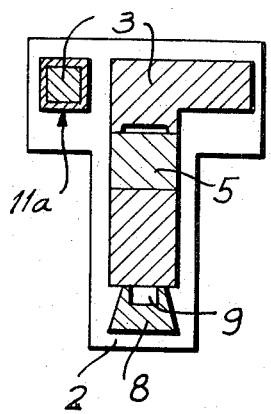
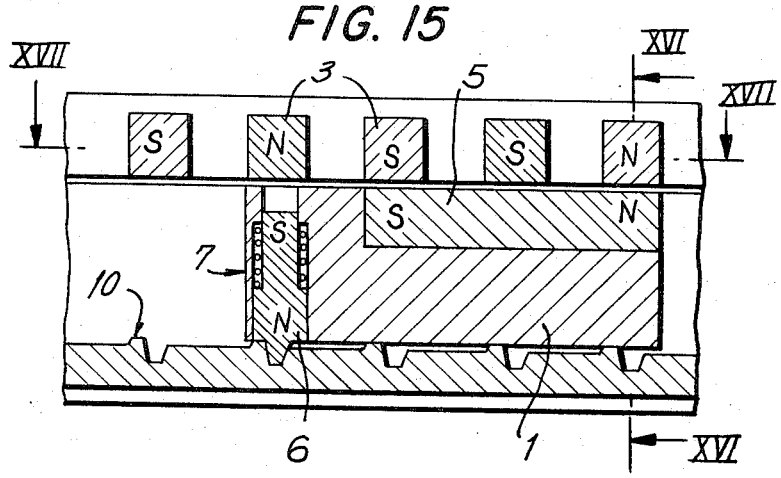
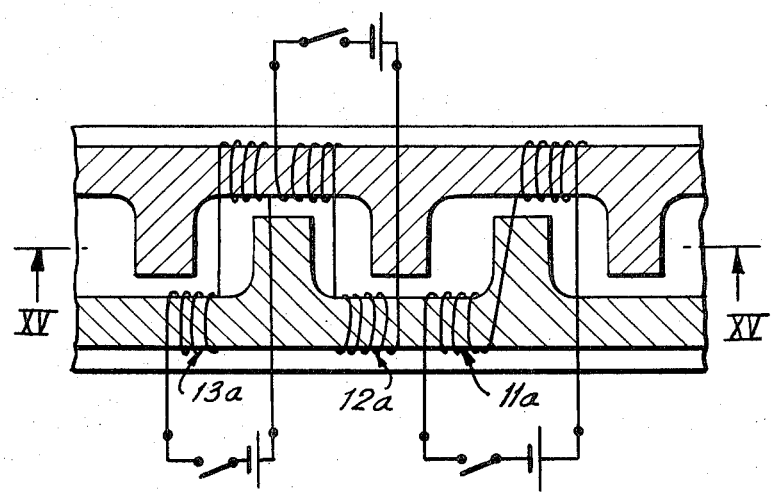

ELECTROMAGNETIC STEPPING MOTOR

FIELD OF THE INVENTION

The present invention relates to a mechanical induction stepping device or motor with electromagnetic controls allowing a rectilinear or circular displacement or the like.

BACKGROUND

The excitation of an external circuit (e.g., for firing, pyrotechnical alignment, valve control and so forth) diagramatically illustrated in FIG. 1 is achieved generally from components such as relays or motors controlled by an electronic assembly in which a series of events or steps takes place.

Safety requirements exist and a considerable number of steps may be involved in an operation and, therefore, there may be the need for a very elaborate electronic control system which cannot be submitted to too harsh an environment (e.g., vibrations, impacts, or thermal or electromagnetic radiations or the like).

In the existing systems, an incident at one of the components or its control can start it working independently of other conditions.

SUMMARY OF INVENTION

An object of the invention is to provide a device insensitive to vibrations, impacts, and thermal or electromagnetic radiations and the like, and adapted for prohibiting various mishaps and enabling a considerable simplification of the assembly of the resulting system.

The mechanical device of the invention responds to the steps directly, each of which makes one element advance one step relative to a second element thereby allowing a desired action.

The rotation of one elemtent toward a second element in a device of the invention is mechanically possible only with a control sequence developing strictly in a desired order.

Also a mechanical locking of each stepping position is a feature of the device of the invention, and assures total safety with respect to any untimely movement of one element towards the other.

In accordance with the invention, an electromagnetically controlled mechanical induction stepping device for rectilinear or circular motion comprises a mobile motor slide in a structure supporting the superpositioning of soft iron frames on which control windings are located. This slide is mechanically and magnetically locked at the end of each stroke and prepared for the next displacement.

The non-magnetic slide mechanism comprises a locking stud formed by a permanent magnet seated, when standstill takes place, in an orifice of the frames or in a soft-iron track.

Also according to the invention, the electromagnetically controlled stepping device is improved from the viewpoint of safety and reliability by a structure and slide system so arranged as to comprise two locking assemblies and two soft-iron frame assemblies identical with the foregoing placed face to face and such that the control windings are in duplicate.

The invention will next be described by relating it to some particular embodiments given by way of example and illustrated in the attached drawings.

BRIEF DESCRIPTION OF DRAWING

FIGS. 9, 10, and 11 illustrate a third embodiment of the invention in various sectional views including a front sectional view along line IX — IX, a righthand sectional view along line X — X, and a top sectional view along line XI — XI, said embodiment being a double-lock rectilinear-motion device;

FIGS. 15, 16 and 17 correspond to FIGS. 3, 4 and 5 with a modification of the winding;

DETAILED DESCRIPTION

Figure 1:
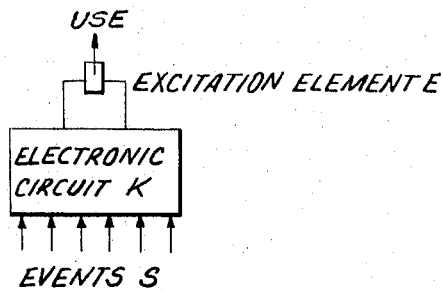
FIG. 1 diagrammatically illustrates the excitation of an external circuit controlled by a sequence of events or steps.

The excitation of an external circuit (e.g., for firing, pyrotechnical alignment, valve control and so forth) is diagramatically illustrated in FIG. 1. The excitation is achieved generally by an excitation element E (e.g. relays, motors) controlled by an electronic circuit K on which acts a series of events or steps S.

Figure 2:
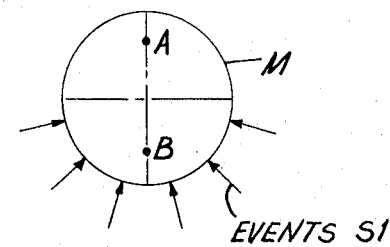
FIG. 2 diagrammatically illustrates a simplification of the system.

The invention relates to a device insensitive to vibrations, impacts, thermal or electromagnetic radiation or the like, prohibiting mishaps and substantially simplified as diagrammed in FIG. 2.

In FIG. 2, the mechanical device M receives the events S1 directly, each of which makes, for example, the rotation of A advance one step toward B, eventually allowing the desired action. The rotation of A toward B is mechanically possible only with a control sequence developing strictly in a provided order.

Also a mechanical locking of each stepping position, inherent in the principle of the device, assures total safety with respect to any untimely movement of A toward B.

Figure 4:
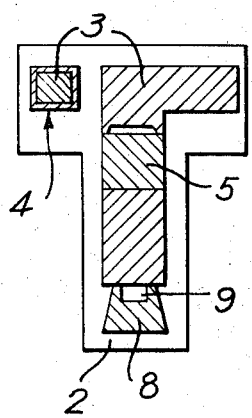
FIGS. 3, 4 and 5 illustrate one embodiment of the invention in various sectional views including a front sectional view along line III — III, a righthand sectional view along line IV — IV and a top sectional view along line V— V, said embodiment being a single-lock rectilinear-motion device.
Figure 3:
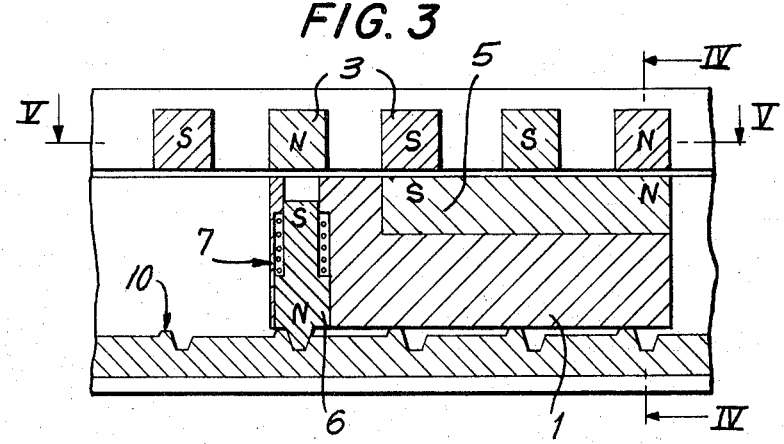
Figure 5:
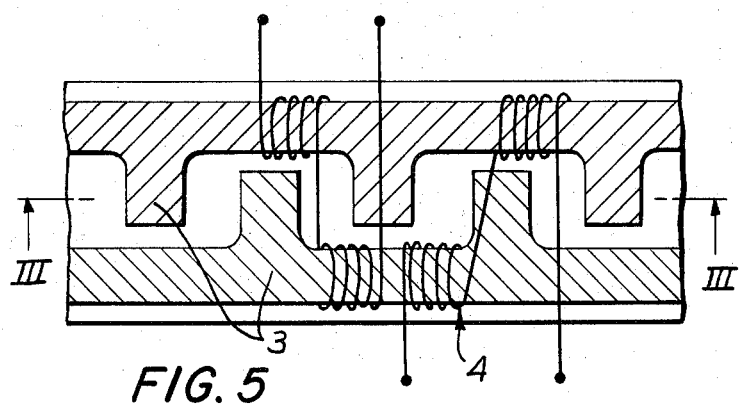

For a rectilinear motion, as shown in FIGS. 3 – 5, the device consists of a mobile slide 1 in a structure 2 carrying in superposition two soft-iron frames 3.

In the initial state, the stop 6 which is a permanent magnet and the propeller or feeding magnet 5 interlock the slide relative to the structure.

In the control sequence, the winding 4 is energized and simultaneously excites the two frames according to the polarities of FIG. 3. The locking stop is attracted by the pole opposite it. The poles facing the permanent feed magnet 5 are of similar signs and produce electromagnetic repulsion. The slide 1 is thus freed from the mechanical and magnetic locks. The contiguous poles of the frames 3 have an attractive polarity with respect to the feed magnet 5 and secure the shifting of the slide 1. The attraction of the locking stop reverses by reason of the joint action of a drawback spring 7, a soft-iron track 8 which tends to pull the magnet back and the next sequential pole whose polarity is repulsional. The movement of the slide is locked when the locking stop meets the buffer 10 and takes another seat in tap 9 of the soft-iron track 8.

The apparatus is once more in the initial state opposite a new control winding.

Figure 6:
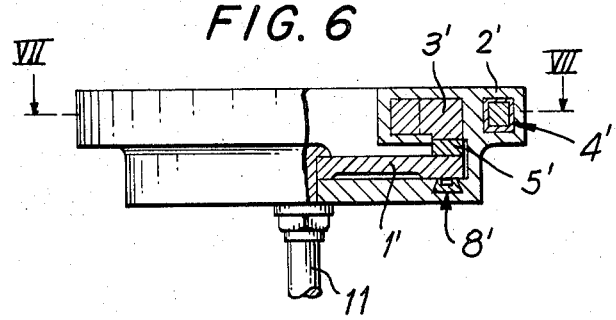
FIGS. 6 and 7 illustrate a second embodiment of the invention in various sectional views including a front sectional view along lines VI — VI and top sectional view along line VII — VII, said embodiment being a single-lock circular-motion device.
Figure 7:
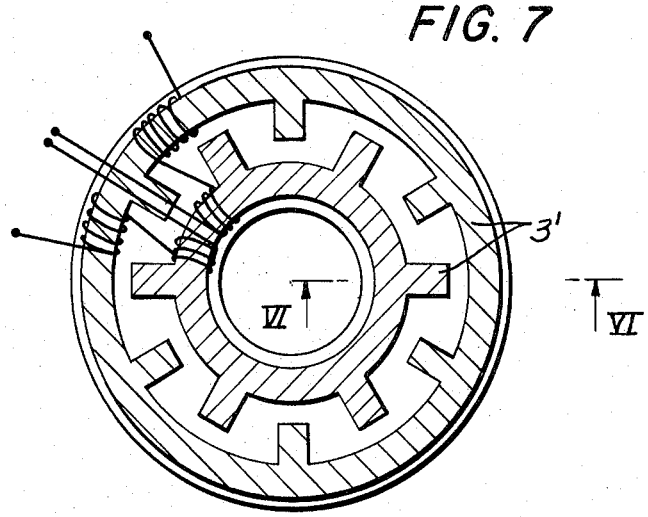
Figure 8:
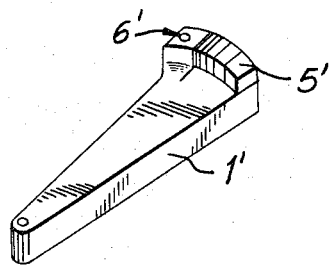
FIG. 8 illustrates a motor slide in perspective view for a single-lock, circular-motion device.

The principle of the circular motion is identical with that of the rectilinear motion. The mechanical notion is illustrated by FIGS. 6, 7 and 8 wherein corresponding reference characters are marked with primes. The motor shaft 11 is integral with the slide.

Figure 12:
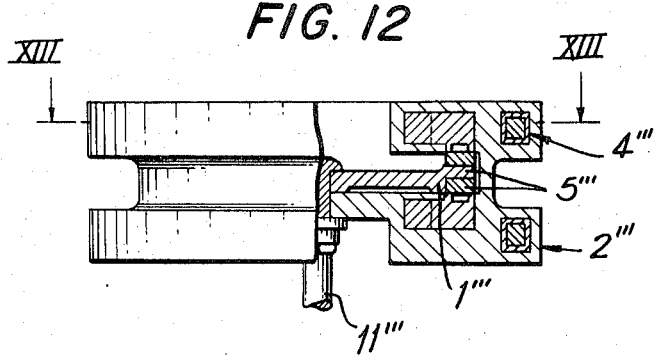
FIGS. 12 and 13 illustrate a fourth embodiment of the invention in various sectional views including a front sectional view along line XII — XII and a top sectional view along line XIII — XIII, said embodiment being a double-lock, circular-motion device.
Figure 13:
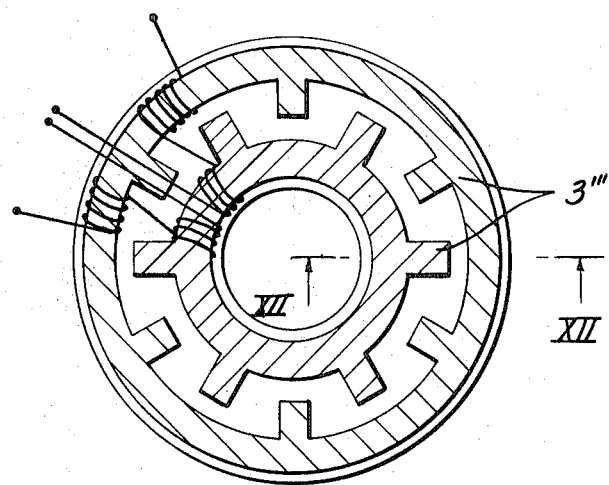
Figure 14:
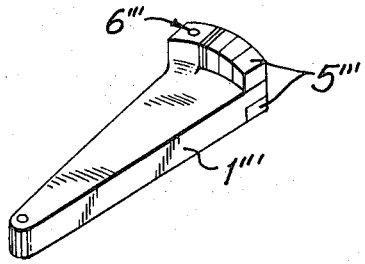
FIG. 14 illustrates a motor slide, in perspective view, for a double-lock, circular-motion device.

This device can furthermore easily accept, as in FIGS. 9, 10 and 11(wherein corresponding reference characters are marked with double primes), or FIGS. 12, 13 and 14 (wherein corresponding reference characters are marked with triple primes), a symmetrical assembly relative to the plane of movement, this increasing the reliability and making the device insensitive to vibrations, from which is derived its importance in applications having to undergo severe environmental conditions. The clearing of the locking stops is effected by repulsion of the permanent magnets constituting said stops.

The presence of like polarities facing each other allows the stop drawback spring used in the nonsymmetrical device to be eliminated.

The invention can be used to entrain any mechanical or electromechanical system, the dimensions of the device being adapted to the power required.

In particular, the rotary-motion stepping allows the entrainment of:
  any electrical multiple switch usable in missile, torpedo or magnetic mine programming;
  a primer, propellant, or military charge arming jack; and
  a control for valves or gates whose opening presents a degree of danger.

Among the features differentiating the device of the invention from other types of electromagnetic stepping motors are as follows:
1. separate control at each step;
2. magnetic and mechanical interlock at each step when the device is not under load.

Figure 18:
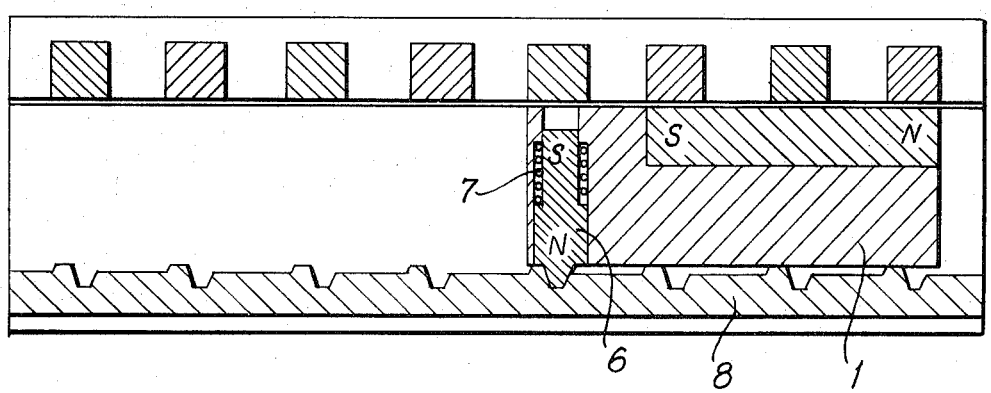
FIGS. 18, 19 and 20 illustrate the operation of the device of FIGS. 15 - 17.
Figure 19:
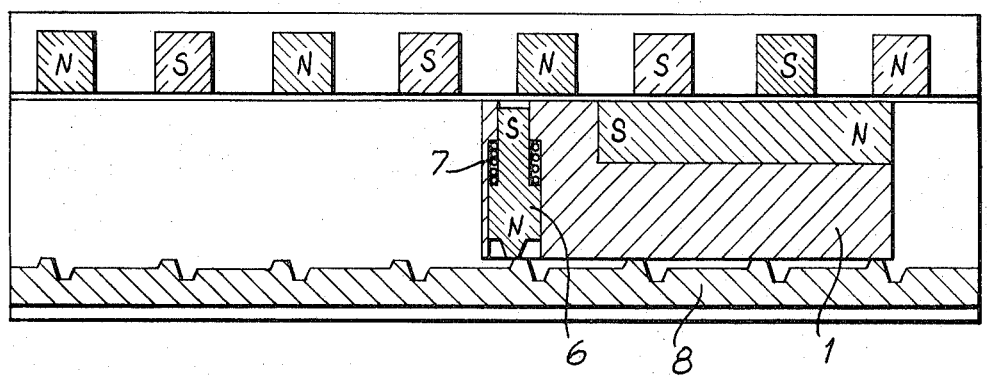
Figure 20:
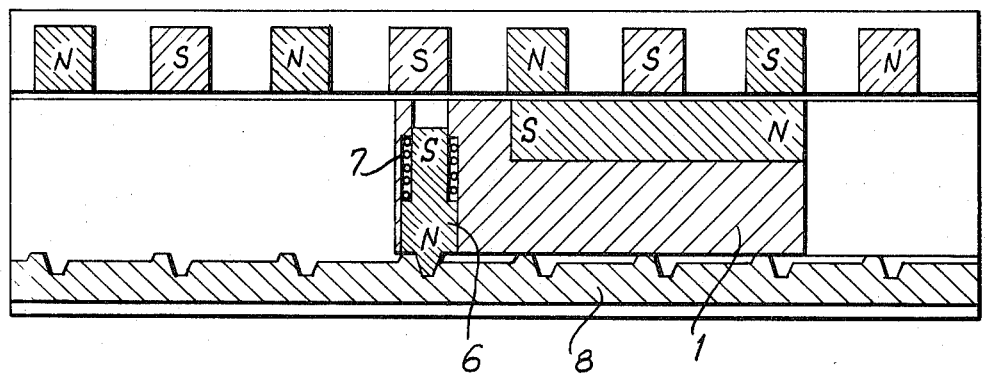

The device of FIGS. 15–17 comprises the same structure with the exception of control windings 11a, 12a, and 13a equal in number to the number of step positions. Under the action of electromagnetic forces, permanent magnet 5 firmly attached to a non-magnetic support and forming a motorslide 1 moves in said structure. Said motor bogie is locked magnetically and mechanically at each position. FIGS. 18–20 show the operation of the device.

The device passes through two stages:
1. the initial off-load locked stage (FIG. 18);
2. the excited stage (FIG. 19) due to charging of a winding which effects circuit break and unidirectional translation.

The outcome (FIG. 20) of the excited state is the initial stage for the next step.

In FIG. 8, the magnetic circuit of permanent magnet 5 is closed by the strengths of poles coming opposite the poles of said magnet. The slide then is in a magnetically stable state.

Permanent magnet 6 sliding in the slide 1 transversely to the movement thereof is engaged in a seat in the soft-iron track 8 under the action of spring 7 and the magnetic attraction of said track.

As appears in FIG. 19, winding 11a is energized and creates a sequence of polarities shown. The permanent locking magnet attracted by the North pole opposite it leaves it seat and allows the slide to move. In fact, the poles of the structure opposite those of the permanent magnet are of like sign and repel the slide toward the only configuration of adjacent poles likely to be attractive.

The permanent locking magnet is repelled at the end of the movement by a pole of like sign to which is added the action of the spring 7. It follows the groove 9 of the track and meets the buffer 10, thus entering the following seat which again secures the mechanical locking (FIG. 20).

The break of supply to winding 11a has no further effect, and the device is again at the initial state of the second step. The following movement will take place when the winding 12a is excited, creating a succession of polarities identical to the preceding one but shifted one step further in the direction of the movement. The normal programming of the motor is a successive charing of the windings, such charging ceasing with the end of the movement. In case of the charging program not being adhered to, the distribution of the polarities is a function of the charged coils. Certain combinations prohibit or permit the movement according to the position of the slide.

The prior text describes a rotary motion device working on the principle just described, but the magnetic field at the poles is greatly attenuated by reason of the magnetic circuit being closed again on itself. The embodiment described in FIGS. 21 and 22 allows this drawback to be removed and simplifies the locking mechanism.

Figure 21:
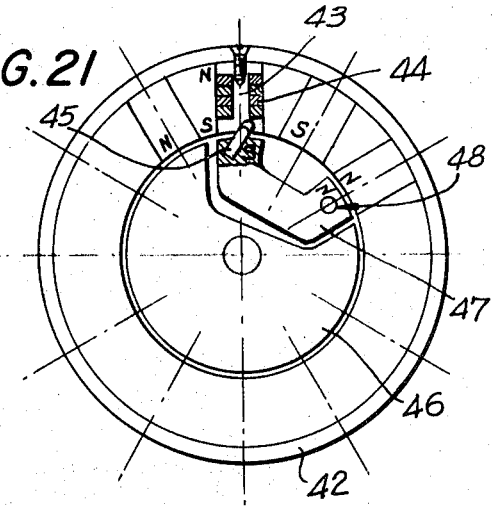
FIGS. 21 and 22 illustrate a further embodiment of the invention.
Figure 22:
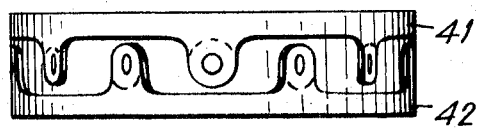
Figure 23:
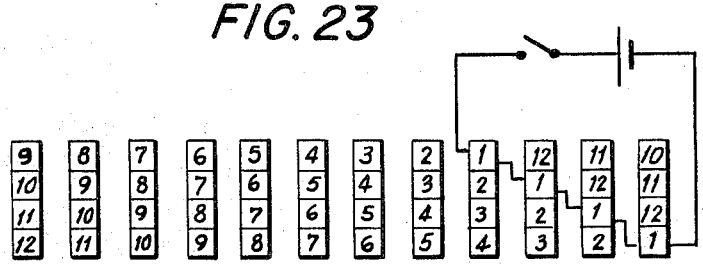
FIG. 23 illustrates the cluster of windings employed in the apparatus of FIGS. 21 and 22.

The device of FIGS. 21 and 22 comprises:

A stator composed of two soft-iron shells 41 and 42 interlapped and supporting cores, also of soft iron each comprising four windings 44. Each core is provided with a seat into which the lock pawl 45 of the rotor engages. A cluster of windings comprises in series or in parallel a winding of four successive cores. This arrangement is shown in diagrammatic form in FIG. 13 of the stator linearly developed where the cluster 1 is shown with its load.

A non-magnetic rotor 46 carrying a permanent magnet 47 is pivotable around a stud 48 passing through its North pole. This magnet has a length equal to two steps. The South pole comprises a lock pawl 45 arranged so that its displacement will not entail any shifting of the rotor.

The device passes through two stages:
1. the initial locked uncharged state;
2. the state excited by charging of a group of four windings.

The permanent magnet of the rotor in the initial state is magnetically locked by the two polar strengths standing opposite it and mechanically on one of them by the South pole locking pawl.

In the switching state, the switching on of a cluster of windings comprising a winding of four successive cores induces the four polarities North-South-South-North in the same way as in FIG. 19. The South pole of the permanent magnet is repelled thus causing the switching off of the rotor. This permanent magnet is attracted by the adjacent poles which are of attractive polarities. This movement can be effected only in one direction. At the end of shifting, the rotor is gain locked in, the cutoff of supply having no effect on the locking anymore than any mechanical action on the rotor.

Figure 24:
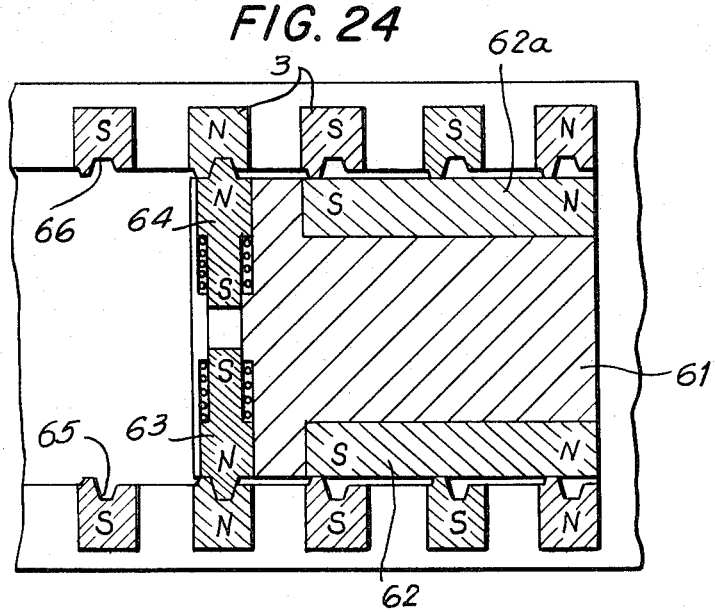
FIG. 24 illustrates still another embodiment of the invention constituted by a variation of the embodiments illustrated in FIGS. 15 - 17.

The device of FIG. 24 also allows a mechanical stepping induction starting from a programmed series of events translatable into electrical voltages.

FIG. 24 illustrates another embodiment of an invention which incorporates a slide 61 in which is embedded magnets 62a and 62b as well as permanent magnets 63 and 64 displaceable in opposite directions transversely of the direction of movement of the slide 61. The permanent magnet 63 is received in seats 65 whereas the permanent magnet 64 is accommodated in seats 66. The embodiment functions generally as has been described hereinabove with respect to those embodiments involving rectilinear movement.

There will now be obvious to those skilled in the art many modifications and variations of the structures set forth hereinabove. These modifications and variations will not depart from the scope of the invention if defined by the following claims.

What is claimed is:

1. A stepping device including at least one magnetizable frame, a non-magnetic member displaceable in said frame, means for establishing a series of North and South poles along said frame, a magnet fixed on said member to cooperate with said poles to step said member along said frame, and a second magnet on said member and displaceable relative thereto in accordance with the proximity thereof to said poles, said frame being provided with recesses to receive said second magnet to lock the said member to said frame whereby a utility mechanism attached to said member can be moved in stepped progression.

2. A device as claimed in claim 1 comprising a second magnetizable frame associated with said first frame and having therein a series of interposed poles.

3. A device as claimed in claim 1 wherein the frame and member are shaped for the rectilinear progression of the latter.

4. A device as claimed in claim 1 wherein the frame and member are shaped for the circular progression of the latter.

5. A device as claimed in claim 2 wherein said frames are generally linear.

6. A device as claimed in claim 2 wherein said frames are generally circular.

7. A device as claimed in claim 1 comprising buffers on the frame adjacent the recesses.

8. A device as claimed in claim 1 comprising a spring associated with said second magnet to urge the latter either into or out of said recesses.

9. A device as claimed in claim 1 comprising a further displaceable magnet on said member to operate in conjunction with said second magnet.

10. A device as claimed in claim 1 wherein said frame is of soft iron.

11. A device as claimed in claim 2 wherein said frames are of soft iron.

12. A device as claimed in claim 1 wherein said means includes serially arranged electromagnetic coils on said frame.

13. A device as claimed in claim 2 wherein said means includes serially arranged electromagnetic coils on said frames.

14. A device as claimed in claim 4 comprising a lock pawl on said member.

15. A device as claimed in claim 5 comprising a lock pawl on said member.

16. A device as claimed in claim 14 wherein said member is a rotor and the first said magnet has a length effectively equal to two steps.

17. A device as claimed in claim 16 wherein the first said magnetic has North and South poles, said pawl being mounted by said South pole, said device comprising a stud on said rotor passing through said North pole.

* * * * *